United States Patent Office 3,098,840
Patented July 23, 1963

3,098,840
COATING COMPOSITION COMPRISING A SOLVENT SOLUTION OF RUBBER AND AN ISOCYANATO ARYL PHOSPHOROUS COMPOUND
Hans Holtschmidt, Cologne-Stammheim, and Franz von Spulak, Erwin Müller, and Otto Bayer, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Feb. 26, 1959, Ser. No. 795,620
Claims priority, application Germany Mar. 1, 1958
8 Claims. (Cl. 260—45.9)

This invention relates to coating compositions and a method for their preparation. More particularly, this invention relates to coating compositions containing isocyanato aryl derivatives of phosphoric acid and thiophosphoric acid.

Mixtures of organic hydrocarbon polyisocyanates and natural or synthetic rubber are known to be useful coating compositions. Coatings of this character may be used as adhesives or for protective or decorative purposes. Particularly suitable coating compositions of this type for various solid materials, such as, rubber, plastics, fabrics and the like are made from solutions of natural or synthetic rubber with organic hydrocarbon polyisocyanates, such as, 4,4',4"-triisocyanato triphenyl methane. Solutions of polyisocyanates in organic solvents have been successful as bonding agents even in the absence of rubber. Many of the isocyanates useful in the heretofore known coating compositions are bluish violet or purple. Consequently, they cannot be used for application on articles where the dark color would be aesthetically offensive, for example, for transparent or colorless adhesive coatings.

Even more serious consequences result from the light instability of the heretofore known coating compositions. Thus, even though the color of the originally applied coating compositions may not be offensive, the resulting coatings tend to become discolored on exposure to light.

It has also been proposed to prepare coating solutions for textiles from dimers of aromatic diisocyanates and hydroxyl containing phosphate polymers. These polymers must be heated to release isocyanates for reaction with surface hydrogen. The color characteristics of these polymers are also unsatisfactory. Since the phosphorous portion of the molecule is only bonded to the isocyanate portion through urethane linkages no essential change in color characteristics results.

It is an object of this invention to provide improved coating compositions containing polyisocyanates. A further object of this invention is to provide coating and adhesive compositions containing polyisocyanates with improved light stability. Still another object of this invention is to provide coating compositions containing polyisocyanates with reduced tendency to discolor under the influence of sunlight and suitable for use as adhesives.

The foregoing objects and others which will become obvious from the following description are accomplished in accordance with this invention, generally speaking, by providing a coating composition comprising a solution of an isocyanato aryl derivative of a phosphoric acid. Thus, this invention contemplates coating compositions comprising solutions of isocyanato aryl phosphorous esters, thioesters and amides having the formula

wherein X is oxygen or sulphur, R represents O-aryl, O-aralkyl, O-alkaryl, O-cycloalkaryl, S-aryl, S-aralkyl, S-alkaryl, S-cycloalkaryl, N-(aryl)$_2$, N(alkyl)(aryl), N(alkaryl)$_2$, N(aralkyl)$_2$, or N(cycloalkaryl)$_2$; R' and R" may be either the same or different and may be R, O-alkyl, O-cycloalkyl, S-alkyl, S-cycloalkyl, N-(alkyl)$_2$, N-(cycloalkyl)$_2$; at least two aromaticaly bonded —NCO groups being present in the molecule. According to a specific embodiment these solutions contain an additional amount of natural and/or synthetic rubber.

Isocyanato aryl derivatives of phosphoric acids and thiophosphoric acids which are employed in accordance with the present invention are prepared, for example, by the phosgenation of corresponding amino aryl phosphoric acid derivatives. A suitable process for the preparation of these isocyanates is disclosed in copending application, Serial No. 789,810, filed January 29, 1959, by Hans Holtschmidt. Thus, the isocyanato aryl derivatives of phosphoric acid are prepared by phosgenating the corresponding amino aryl phosphoric acid derivatives. The amino aryl phosphoric acid derivatives may be prepared by nitration followed by reduction of the corresponding phosphoric acid and thiophosphoric acid esters, thioesters or amides such as triphenyl phosphate and the like. Specific examples of compounds which may be used in the compositions of the present invention are 4,4',4"-triisocyanato phenyl phosphate,
4,4',4"-triisocyanato phenyl thiophosphate,
4,4',4"-triisocyanato benzyl phosphate,
4,4',4"-triisocyanato benzyl thiophosphate,
Diethyl-4-isocyanatophenyl phosphoric acide triester,
Diethyl-4-isocyanatophenyl thiophosphoric acid triester,
Cyclopentadienyl-4-isocyanatophenyl phosphoric acid diester,
Dimethyl amide,
Cyclopentadienyl-4-isocyanatophenyl thiophosphoric acid diester dimethyl amide,
Ethyl, vinyl, 4-isocyanato naphthyl phosphoric acid triester,
Ethyl, vinyl, 4-isocyanato naphthyl thiophosphoric acid triester,
Ethyl phosphoric acid ester-bis (N-methyl-N-4-isocyanatophenyl amide),
Ethyl thiophosphoric acid ester-bis (N-methyl-N-4-isocyanatophenyl amide),
(3-isocyanato-5-methyl phenyl) phosphoric acid triester,
(3-isocyanato-5-methyl phenyl) thiophosphoric acid triester,
(3-isocyanato-5-methyl phenyl) dithiophosphoric acid triester,
4,4',4"-triisocyanatophenyl dithiophosphate,
4,4',4"-triisocyanatophenyl tetrathiophosphate,
4-isocyanato, 6-chlorophenyl diethyl phosphoric acid triester,
4-isocyanato, 6-chlorophenyl diethyl thiophosphoric acid triester
Indenyl-4-isocyanato phenyl phosphoric acid diester, N,N-indenyl amide,
Ethyl dithiophosphoric acid ester-(bis-N,N-4-isocyanato phenyl) amide,
4,4',4"-triisocyanato indenyl trithiophosphate,
4,4'-diisocyanato phenyl phosphoric acid diester, N,N-cyclopentadienyl amide,
4,4',4"-triisocyanato benzyl dithiophosphate,
Phenyl phosphoric acid ester bis (N,N-4-isocyanato phenyl amide),
Phenyl phosphoric acid ester bis (N,N-3-isocyanato, 5-methyl phenyl amide),
Phenyl phosphoric acid diester, N,N-4-isocyanato benzyl amide,
Dicyclopentadienyl dithiophosphoric acid diester-(bis-N, N-4-isocyanato phenyl) amide.

The substituents in the above-mentioned general formula may also contain further substituents, such as, for example, halogen, such as, chlorine, iodine and bromine; alkoxy, such as, methoxy, ethoxy and propoxy; carboxylic acid ester, such as, carbomethoxy, carboethoxy and carbobutoxy, and unsaturated hydrocarbon, such as, vinyl, allyl and butenyl, in addition to the isocyanato groups which are attached to a carbon atom of an aromatic ring. Further, isocyanato derivatives containing more than one phosphoric acid or thiophosphoric acid nucleus are contemplated by the invention. In such cases, R' and R" may represent radicals of polyhydric alcohols, such as, for example ethylene glycol, 1,3-propylene glycol, 1,4-butylene glycol and the like, polyvalent amines, such as, for example, N,N-ethylene diamine, N,N-1,3-propylene diamine, N,N-1,4-butylene diamine and the like, linear or branched polyesters, such as, for example, the reaction product of succinic acid with trimethylol propane or ethylene glycol, and the like, polyethers, such as, for example, those obtained from the condensation of alkylene oxides and compounds such as diethylene glycol, polyamides, such as, for example, ethyl, propyl and butyl amides, polyester amides, such as, for example, the reaction product of succinic acid with amino alcohols and more particularly 1-amino, 2-hydroxy ethylene and the like and polythioethers, such as, for example, thioglycols and more particularly thiodiglycol which link two or more phosphoric acid or thiophosphoric acid nuclei through oxygen, sulfur and/or nitrogen atoms. Representative compounds of this type contemplated by the invention are, for example, those having the following formulae:

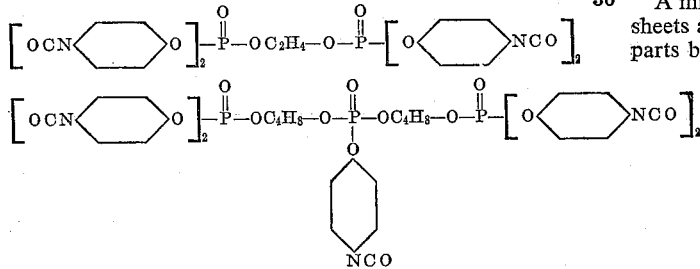

It is also possible to use adducts of these phosphorous containing isocyanates with polyhydric alcohols. Thus, one may react on excess of the isocyanate with a polyhydric alcohol and then combine the reaction product with rubber. Any suitable polyhydric alcohol may be used, for example 1,4-butane diol, trimethylol propane and pentaerythritol.

Natural rubber or synthetic rubber, for example, butadiene-styrene rubber, butadiene-acrylonitrile rubber or other copolymers of dienes with polymerizable ethylenically unsaturated compounds, for example, with polymers of 2-chlorobuta-1,3-diene are used in accordance to a specific embodiment of the invention in combination with the foregoing polyisocyanates to produce coatings and adhesives which are light stable and which show good bonding action. Such solutions are especially suitable for the production of elastic, pliable and firmly adhering coatings on rubber articles of all types, metal, plastics, fabrics and the like. Further the coatings have proved especially suitable for protective layers for solid and sponge rubber articles. Protective layers produced from these coating compositions according to the invention render the coated articles resistant to temperature and weather even without additional vulcanization. The solutions of the isocyanato aryl phosphorous derivatives of the invention if desired in combined solution with natural and/or synthetic rubber show improved thermal bonding strength as well as rapid initial power by comparison with other comparable binders. A further advantage of the novel coating and adhesive compositions is their low combustibility. The adhesive films are not discolored on exposure to light and the physiological properties of the polyisocyanates permit them to be used on a large scale for bonding any suitable desired solid material of the same or different character, for example bonding rubber to rubber, rubber to leather, rubber to textiles, rubber to metal, fabric to fabric and the like.

Any suitable solvent may be used to prepare the isocyanate solution. Suitable solvents for example are aromatic hydrocarbons, chlorinated hydrocarbons, ketones and esters. Examples of solvents which may be used are benzene, toluene, xylene, acetone, ethyl acetate, butyl acetate, methylene chloride and trichloroethylene. The concentration of the solution is not critical, but it is preferred to use the components in about 15% to about 20% solutions. The solutions may be further diluted or concentrated of course, preferably within the range of about 5% to about 30% rubber and about 5% to about 50% isocyanate.

Any suitable combination of rubber and isocyanate may be used. A suitable range of proportions of rubber to isocyanate is within the range of about 10:1 to about 1:10. It is preferred to use the components within the range of about 3:1 to about 1:3. A proportion of about 1:1 is satisfactory for many applications.

The coating composition of the invention is prepared by combining the rubber and isocyanate and thereafter applying the coating to a substrate which is preferably roughened. It is, of course, possible, and often preferable, to apply more than one coating.

In order to better describe and further clarify the invention, the following are specific embodiments.

*Example 1*

A mixture of about 100 parts by weight of crude rubber sheets about 80 parts by weight of zinc oxide and about 5 parts by weight of colophony is dissolved in the ratio of about 1:4 in benzene and about 100 parts by weight of this solution are mixed prior to use with about 10 parts by weight of an approximately 20% solution of (p-isocyanatophenyl) phosphoric acid-triester in methylene chloride. Strips of vulcanized rubber about 20 mm. wide are stuck with an overlap of about 1 cm. For this purpose, the places where the adhesive is applied are roughened, each coated twice with solution and each coating is dried for about 10 minutes at room temperature. The adhesive areas are then briefly pressed one against the other.

The strength values obtained at room temperature in kg. absolute and in dependence on the storage time are then as follows.

| Storage time: | Kg. absolute |
|---|---|
| 15 min. | 30 |
| 30 min. | 31 |
| 1 hour | 36 |
| 2 hours | 40 |
| 4 hours | 44 |
| 8 hours | 44 |
| 24 hours | 49 |
| 48 hours | 50 |

The thermal strength of the bond after standing for about 24 hours at about 40° C. is about 39 kg. abs. and at about 50° C. it is about 36 kg. abs.

*Example 2*

Using the same procedure as in Example 1, the following adhesive solution is employed:

About 100 parts by weight of a polymer of 2-chlorobuta-1,3-diene, about 4 parts by weight of zinc dimethyl dithiocarbamate. The mixture is dissolved in the ratio about 1:2.5 in about 3 parts by weight of trichloroethylene and about 7 parts by weight of ethyl acetate. About 10% by volume of an approximately 20% solution of (p-isocyanatophenyl)-phosphoric acid-triester in methylene chloride is then added to this solution. The bonding strength values after standing at room temperature are as follows.

| Storage time: | Kg. abs. |
|---|---|
| 15 min. | 25 |
| 30 min. | 30 |
| 1 hour | 31 |
| 2 hours | 34 |
| 4 hours | 38 |
| 8 hours | 42 |
| 24 hours | 45 |
| 48 hours | 50 |

The thermal strength after standing for about 24 hours at about 40° C. is about 35 kg. abs. and at about 50° C. it is about 33 kg. abs.

*Example 3*

The following mixture is used:

About 100.0 parts by weight of light crepe,
About 10.0 parts by weight of zinc oxide,
About 2.6 parts by weight of sulphur,
About 0.6 part by weight of dibenzothiazyl disulphide,
About 0.15 part by weight of tetramethyl thiuramdisulphide,
About 1.0 part by weight of stearic acid,
About 40.0 parts by weight of barium sulphate,
About 3.0 parts by weight of titanium dioxide, and
About 5.0 parts by weight of coloring matter.

The mixture is dissolved in the ratio about 1:4 in benzene and about 10% by volume of an approximately 20% polyisocyanate solution in methylene chloride as mentioned in Example 1 is added thereto. The solution is applied by dipping, brushing or spraying to rubber articles of all types, perhaps to solid rubber or to sponge rubber. After drying for several hours at room temperature, firmly adhering elastic coatings are obtained in any desired colors, by which the rubber articles in question are given a more pleasing appearance.

*Example 4*

A steel surface is sand blasted and then brushed with a 20% methylene chloride solution of tri-p-isocyanato phenyl thiophosphoric acid triester. After half an hour the following rubber mixture is applied to the pretreated surface:

100.0 parts by weight of sheets
30.0 parts by weight of carbon black
20.0 parts by weight of zinc oxide
3.5 parts by weight of sulphur
2.0 parts by weight of stearic acid
1.2 parts by weight of phenyl-β-naphthyl amine
1.0 part by weight of mercapto benzothiazol Vulcanization is performed under pressure of 4 atm. at 151° C. for 30 minutes. A cylindrical test plate of 30 mm. diameter shows a bonding strength of 90 kg./cm.$^2$.

*Example 5*

100 parts by weight of light crepe, 80 parts by weight of zinc oxide, and 5 parts by weight of colophony are dissolved in a ratio of 1:4 in benzine. The solution is mixed with 10% by volume of an approximately 20% polyisocyanate solution of tri-p-isocyanate phenyl thiophosphoric acid triester in methylene chloride.

A rubber surface and a leather surface which are to be bonded are sand blasted and thinly brushed with this solution. The leather surface may be treated with the solution twice. The surfaces are then dried for about 10 to 15 minutes and then pressed together. After standing at room temperature for about 24 hours the bonding strength is 45 kg./cm$^2$. In the same way, two sheets of leather can be bonded. The bonding strength is 83 kg./cm.$^2$. Probably the bonding strength is still higher since during the test the leather sheet is broken.

*Example 6*

A rubber mixture is prepared as follows:

100 parts by weight of sheets (10 min. masticated at 50° C.)
8 parts by weight of zinc oxide
2 parts by weight of mineral oil
3 parts by weight of stearic acid
10 parts by weight of siliceous earth
3 parts by weight of titanium dioxide
3 parts by weight of sulphur
1 part by weight of mercapto benzothiazol The mixture is dissolved in a ratio of 1:4 in benzine. The resulting solution is mixed with 15% of a 20% methylene chloride solution of tri-p-isocyanato phenyl thiophosphoric acid triester.

An artificial silk fabric is dried for half an hour at 70° C. and then coated on both sides with the above solution. The fabric thus pretreated is then coated with the above rubber mixture and vulcanized under pressure of 3.5 atm. for 30 minutes. The bonding strength is 26–28 kilograms and would be only 6–8 kilograms in the absence of the polyisocyanate.

A nylon fabric is coated with rubber in the same way. The bonding strength which in the absence of the polyisocyanate is 4–6 kilograms, is by following the process of the invention increased to about 18–20 kilograms.

If a fabric made of a polyterephthalate is coated with the same rubber composition the bonding strength would be 3–5 kilograms in absence of the polyisocyanate, and 15–17 kilograms in the presence of the polyisocyanate.

*Example 7*

The mixture of 100 parts by weight of light crepe
80 parts by weight of zinc oxide
5 parts by weight of colophony are dissolved in the ratio of 1:4 in benzine. The resulting solution is admixed with 10% of a 20% methylene chloride solution of di-p-isocyanato phenyl phosphoric acid diester-N-methyl-N-phenyl amide. Two rubber surfaces which are to be bonded are roughened and then coated with the solution. Each coating is dried for about 15 minutes at room temperature. The adhesive areas are then briefly pressed one against the other. The bonding strength is 44 kilograms. The thermal strength of the bond after standing for 48 hours at room temperature is about 35 kilograms at 40° C.

*Example 8*

The rubber solution of Example 7 is admixed with 10% of a 20% methylene chloride solution of di-p-isocyanato phenyl phosphoric acid diester chloride. With this solution vulcanized rubber is to be bonded. The surfaces of the rubber sheets are roughened and then thinly brushed with the solution. The coating is then dried for about 15 minutes at room temperature. When the rubber sheets have been briefly pressed one against the other the bonding strength after 24 hours is 52 kilograms. The thermal strength is 49 kg. at 40° C., and 41 kilograms at 50° C.

Although only some of the aforementioned synthetic rubbers and isocyanato aryl phosphoric acid derivatives were used in the foregoing examples, any of the abovementioned synthetic rubbers or isocyanato aryl phosphoric acid derivatives could have been used with essentially the same results. Instead of the natural rubber solutions, it is also possible to use solutions containing polymers of 2-chlorobuta 1,3-diene, a butadiene-acrylonitrile copolymer or a butyl rubber mixture.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A coating composition comprising an organic solvent solution of conjugated diene rubber and an isocyanato aryl phosphorous compound having the formula

wherein X is selected from the group consisting of oxygen and sulfur, R is selected from the group consisting of O-aryl, O-aralkyl, O-alkaryl, S-aryl, S-aralkyl, S-alkaryl, N-(aryl)$_2$, N-(alkyl)(aryl), N-(alkaryl)$_2$ and N(aralkyl)$_2$; R' and R" are selected from the group consisting of R as set out above, O-alkyl and S-alkyl; at least two aromatically bonded —NCO groups being present in the molecule.

2. The coating composition of claim 1 wherein said isocyanato aryl phosphorous compound is 4,4',4"-triisocyanato phenyl phosphate.

3. The coating composition of claim 1 wherein said isocyanato aryl phosphorous compound is 4,4',4"-triisocyanato phenyl thiophosphate.

4. The coating composition of claim 1 wherein said isocyanato aryl phosphorous compound is di(4-isocyanato phenyl) phosphoric acid diester-N-methyl-N-phenylamide.

5. The coating composition of claim 1 wherein said isocyanato aryl phosphorous compound is di(4-isocyanato phenyl) phosphoric acid diester chloride.

6. The coating composition of claim 1 wherein the proportions by weight of said rubber to said isocyanato aryl phosphorous compound is within the range of from about 10:1 to about 1:10.

7. The coating composition of claim 1 wherein the proportions by weight of said rubber to said isocyanato aryl phosphorous compound is within the range of from about 3:1 to about 1:3.

8. The coating composition of claim 1 wherein the proportions by weight of said rubber to said isocyanato aryl phosphorous compound is about 1:1.

References Cited in the file of this patent

UNITED STATES PATENTS

| | | |
|---|---|---|
| 2,801,987 | Fortune | Aug. 6, 1957 |
| 2,881,147 | Graham | Apr. 7, 1959 |

OTHER REFERENCES

De Bell et al.: "German Plastics Practice" (Dept. of Commerce) (1946), page 310 et seq.